United States Patent [19]

Hansch et al.

[11] 4,169,085

[45] Sep. 25, 1979

[54] AQUEOUS ELECTRICALLY INSULATING VARNISH AND A PROCESS FOR ITS PRODUCTION

[75] Inventors: Ferdinand Hansch, Wedel; Knut von Loh, Bad Oldesloe; Harald Janssen, Reinbek, all of Fed. Rep. of Germany

[73] Assignee: Dr. Beck & Co. AG, Hamburg, Fed. Rep. of Germany

[21] Appl. No.: 870,491

[22] Filed: Jan. 18, 1978

[30] Foreign Application Priority Data

Jan. 20, 1977 [DE] Fed. Rep. of Germany ....... 2702121

[51] Int. Cl.² .......................... C08J 3/00; C08J 3/08; C08L 79/08
[52] U.S. Cl. ............................................. 260/29.2 N
[58] Field of Search ................................... 260/29.2 N

[56] References Cited

U.S. PATENT DOCUMENTS

| | | | |
|---|---|---|---|
| 3,518,219 | 6/1970 | Lavin et al. | 260/29.2 N |
| 3,573,132 | 3/1971 | Ducloux et al. | 260/29.2 N |
| 4,008,195 | 2/1977 | Ishizuka et al. | 260/29.2 N |

*Primary Examiner*—Theodore Morris
*Attorney, Agent, or Firm*—Michael J. Striker

[57] ABSTRACT

An aqueous electrically insulating varnish is provided along with a process for producing the varnish; the process comprises the steps of reacting cyclopentane tetracarboxylic acid with dicyclic, diprimary aromatic diamine in the presence of water and neutralizing the condensation product to form a varnish.

9 Claims, No Drawings

AQUEOUS ELECTRICALLY INSULATING VARNISH AND A PROCESS FOR ITS PRODUCTION

BACKGROUND OF THE INVENTION

Electrically insulating lacquer or varnish has come into widespread use as a wire enamel for electrical conductors. Moreover, this varnish is applied as a varnish to impregnate enamelled wire coils. The electrical industry has been making steadily increasing demands regarding the heat-resistance of such insulating material over the last decade. Particularly high standards are now being required for the insulation of electrical conductors.

These stringent standards follow the increased tendency to miniaturize electrical apparatuses. An increased unit power and an intimately interrelated elevated temperature in the coils is characteristic of these apparatuses. Also to be considered is the fact that certain electrical machines are already driven generally under high ambient temperatures.

In the future, it is expected that even higher demands will be made on particularly the heat resistance of varnished wires.

One group of quite suitable varnished wires possessing highly desirable mechanical and electrical properties is the group of wires coated with polyimide varnish. These polyimide varnishes and varnish coated wires have already been known for more than a decade. As a high-temperature coating, polyimide has a high-temperature stability (up to 1000° F.), a good wear resistance at high temperature and excellent frictional characteristics.

To produce a polyimide varnish, a tetracarboxylic acid dianhydride—such as pyromellitic acid dianhydride or benzophenone tetracarboxylic dianhydride—is reacted with an aromatic, preferably binuclear diamine,—such as 4,4'-diaminodiphenyloxide. The reaction takes place in a diluted solution including an aromatic solvent—preferably N-methyl-2-pyrrolidone, a well known solvent for resins.

The resulting polyamidocarboxylic acid solution is either directly ready for use or is standardized against a desired varnish viscosity according to the particular field of application.

In most fields of application, the viscosity of the varnish lies within the range of about 500 mPa s—5000 mPa s, corresponding to a solvent content of 84—90% by weight. The definition Mpa s=cP.

A serious disadvantage in the case of applying a polyimide wire varnish with such a high solvent content is the problem of air pollution from the vapors of the usually very corrosive solvent.

Environmental laws require that this air pollution due to these waste gases be reduced to a minimum; consequently expensive installations, such as catalyst elements, are necessarily associated with the varnishing machine.

There is also a problem of the solvent coming into contact with the coating on the wire. This risk is not usually overcome in practice.

From the standpoint of economy, it is highly undesirable to burn or otherwise destroy the high quality, expensive solvent.

A further disadvantage of this solvent-containing polyimide varnish is its low stability in storage. This low stability is the result of the tendency towards cyclization of the polyamido carboxylic acids.

The thermally less stable polyester resins have already been proposed as coatings for electric contacts since these molten resins may be applied without solvents. However, these are not practical substitutes for the polyimide resins since polyester resins lack the extremely high thermal stability of the polyimide.

It would be ideal to use water as both the solvent and the diluent for polyimide resins since the varnish coating applicators present in the conventional wire varnishing machines would not have to be redesigned. Of course, the previously described problem of air pollution and risk to the coating would be obviated by the use of water.

Already, water-soluble wire varnishes of branched polyesters, polyesterimides and the like are well known. The properties of these wire varnishes are however not sufficient for meeting the peak stresses of the electric insulating technology, especially because of the insufficient thermal stability of these varnishes.

SUMMARY OF THE INVENTION

An object of the present invention is to provide polyimide wire varnish in a water-soluble form while maintaining the conventionally high quality level of the properties of the polyimide.

Another object of the invention is to substitute water for organic solvents for the production of polyimide in order to eliminate air pollution due to solvent vapors.

Still another object of the invention is to use cyclopentane tetracarboxylic acid as the tetracarboxylic constituent in a process for making polyimide.

These objects of the invention cannot be gained with the customary processes for the production of polyimide, based on pyromellitic dianhydride and benzophenonetetracarboxylic acid dianhydride.

Aqueous solutions can be maintained if the intermediate polyamidocarboxylic acid products are precipitated, for example with methylene chloride or ether and subequent neutralization of the acidic intermediate product. However, this precipitation is expensive and the resultant solutions, with a workable viscosity of about 5000 mPa s, have a low solid content of below 10% by weight, too low to be effective as a wire varnish. The solids content of neutralized aqueous polyamidocarboxylic acid lies preferably within the range of 2.6 to 6.0% by weight according to French Pat. No. 1,460,157. For a solids content of 10% by weight, the solution has too high a viscosity—about 60,000 cP(=mPa s)—to be used for coating a wire.

Aqueous stoving lacquer of a polyesterimide base has been proposed, with the polyimide component being based on butane tetracarboxylic acid.

Conventional art has explicitly warned against putting the pure polyimide in aqueous solutions, since when these are stoved on electrical wires, coating films are obtained which have such a low plasticity that they peel off when the wire is wound about its own diameter. To make the enamelled wire coatings more elastic, the polyimides are modified with polyester resins containing carboxyl groups.

The inventive concept has been developed with the surprising discovery that the use of cyclopentane tetracarboxylic acid or its anhydride in combination with a diamine results in a water-soluble resin having a relatively high solids content with a technologically advantageous viscosity. The coatings yielded by this resin after stoving have the known high values of conventionally produced polyimides.

DETAILED DESCRIPTION OF THE PREFERRED EMBODIMENT

The inventive concept involves producing an aqueous electrically insulating varnish, particularly for wire. The varnish is prepared by reacting cyclopentane tetracarboxylic acid or its anhydride with a diprimary, dicyclic aromatic diamine in the presence of water and, if desired, in the presence of a water-miscible organic solvent. The acidic reaction product is then neutralized with a volatile basic compound.

The aqueous electrically insulating varnish is produced from a suspension of cyclopentane tetracarboxylic acid or its dianhydride, and a diprimary, dicyclic aromatic diamine in water. Preferably the molecular ratio of the acid or its dianhydride to the diamine is in the range of 0.9–1.1 to 1.1–0.9. The reaction forming the desired varnish takes place with the concomitant use of a water-miscible solvent having a boiling point of preferably 200°–300° C. and being present in an amount which is up to 20% by weight of amount of the acid/dianhydride and the diamine. The starting substances are heated to boiling and are condensed after distilling off the water to an acid value of 100–150. The reaction product is neutralized with ammonia or an amine.

Appropriate diprimary, dicyclic aromatic compounds which may be used in accordance with the inventive concept include, inter alia, (1) 4,4'-diaminodiphenylmethane;
(2) 4,4'-diaminodiphenyloxide;
(3) 4,4'-diaminodiphenylsulfone;
(4) 4,4'-diaminodiphenylsulfide;
(5) 3,3'-diethyl-4,4'-diaminodiphenylmethane;
(6) 3,3'-dimethyl-4,4'-diaminodiphenylmethane;
(7) 3,3'-dimethyl-4,4'-diaminodiphenyloxide;
(8) 3,3'-diethyl-4,4'-diaminodiphenylether;
(9) 3,3'-diethoxy-4,4'-diaminodiphenylether;
(10) 3,3'-dichloro-4,4'-diaminodiphenylether; and
(11) 3,3'-dimethoxy-4,4'-diaminodiphenylsulfide.

The solvent is added as an aid for forming the solution and has the consequent effect of improving flow properties. The solvent is preferably added in an amount which is up to 20% by weight of the initial reactants. The boiling point of the solvent preferably lies in the range of 200°–300° C. in view of the high temperatures prevailing in the enamelled wire stoving oven.

Particularly suitable solvents include polyethylene glycols such as diethylene glycol, and triethylene glycol; also suitable are other water-miscible solvents with boiling points within the preferred range—such as ethyldiglycol, butyldiglycol, N-methylpyrrolidone and others.

As previously mentioned, ammonia or some amine is used to neutralize the reaction product. The amines which are preferred are those having boiling points which are not above 200° C. Such preferred amines include for example, triethylamine; di-n-propylamine; tri-n-propylamine; diisopropylamine; N-ethylbutylamine; N-methylisobutylamine; 1,1-dimethylpropylamine, morpholine, monoisopropanolamine, dimethylisopropanolamine, 3-dimethylaminopropanol, methyldiisopropanolamine, 2-amino-2-methylpropanol, 2-dimethylaminoethanol, 2-diethylaminoethanol, and 2-dimethylamino-2-methylpropanol.

The following examples illustrate a working embodiment of the inventive concept and are not to be construed as limiting the invention.

EXAMPLE 1

246 g of cyclopentane tetracarboxylic acid (1 mole) and 198 g of diaminodiphenylmethane (1 mole) are mixed with 80 g of triethylene glycol and 400 g of distilled water. The resulting mixture is heated while stirring. At 103° C., the mixture is clear and water begins to be distilled off. After 3–4 hours at this temperature, about 400 g of distillate is produced; the acid number of the solution is between 120 and 140. The heating is then stopped, and a mixture of 100 g of a 25% by weight pure ammonia solution and 270 g of distilled water are slowly added while refluxing. In order to remove excess ammonia, the mixture is kept for another hour under reflux. Then an approximately 50% pure, clear solution is obtained. This solution diluted with water to a desired viscosity; there is no restriction as to the amount of this dilution.

After diluting the product with distilled water to a viscosity of 200 mPas, the solids content is about 39% by weight. The varnish is then applied to a copper wire with a 0.5 mm diameter which is drawn six times through a horizontal wire varnishing machine (a system of rollers and felt). As is conventional, the varnished wire is then stoved at 500° C. The speed of drawing is 6.5–7.5 m/minute.

The insulated wire has the following properties:

| | |
|---|---|
| Color tint: | light brown |
| Surface: | smooth |
| Surface Hardness: | 5–6 H |
| Wire wound into a coil an a mandrel with 0.5 mm diameter: | |
| after 15% stretching | no cracks |
| without elongation after 1 hour application at 300° C. | no cracks |
| softening temperature in accordance with DIN (German Industrial Standard) 46453 | 420° C. |

EXAMPLE 2

246 g cyclopentane tetracarboxylic acid (1 mole) and 200 g diaminodiphenyloxide (1 mole) is mixed with 80 g of triethylene glycol and 400 g of distilled water and heated while stirring. At 102° C. the water begins to distil off. The distillation is continued until about 400 g of water is vaporized and an acid number of 146 is attained. The heating is then interrupted as 140 g of 25% pure ammonia solution mixed with 240 g of distilled water is slowly added while refluxing. Refluxing continues 1 hour after the addition. The approximately 50% pure solution is clear and is unlimitedly diluted with water until the desired viscosity is obtained.

The dilution with distilled water brings the viscosity down to 210 mPas and a solids content of about 39% by weight. As is described in Example 1, this varnish is coated on a copper wire of 0.5 mm diameter and then stoved. The varnished wire has the following properties:

| | |
|---|---|
| Color tint: | dark brown |
| Surface: | smooth |
| Surface Hardness: | 6 H |
| Wire wound into a coil on a mandrel with 0.5 mm diameter: | |
| after 20% stretching | no cracks |
| without stretching but after 1 hour at 300° C. | no cracks |
| Softening temperature (DIN 46453) | 400° C. |

EXAMPLE 3

246 g of cyclopentane tetracarboxylic acid (1 mole) and 198 g of diaminodiphenylmethane (1 mole) are mixed with 80 g of triethylenglycol and 400 g of distilled water and heated while stirring. At 103° C., the water begins to be vaporized. After about 400 g of water are distilled off, the acid number is 130. The heating is then halted while a mixture of 140 g of diethylethanolamine and 240 g of distilled water is slowly added. The thus formed mixture is refluxed for an hour following this addition. The approximately 50% pure solution is clear and is unlimitedly dilutable with water to obtain a desired viscosity. Particularly, the solution is diluted with distilled water until a viscosity of 225 mPas is obtained with a solids content of about 36% by weight.

As described in Example 1, a copper wire of a 0.5 mm diameter is insulated and inspected.

The results are as follows:

| | |
|---|---|
| Color tint: | light brown |
| Surface: | smooth |
| Surface hardness: | 5 H |
| Wire wound into a coil on a mandrel with | 0.5 mm diameter |
| after 10% stretching | no cracks |
| without stretching but at 300° C. for 1 hour | no cracks |
| Softening temperature (DIN 46453) | 385° C. |

It will be understood that each of the elements described above, or two or more together, may also find a useful application in other types of an aqueous electrically insulating varnish and a process for its production differing from the types described above.

While the invention has been illustrated and described as embodied in steps and varnishes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An aqueous electrically insulating varnish produced by a process comprising the steps of reacting cyclopentane tetracarboxylic acid with a dicyclic, diprimary aromatic diamine in the presence of water, and neutralizing the condensation product with a volatile base so as to form a varnish.

2. The varnish of claim 1, said step of reacting comprising mixing said cyclopentane tetracarboxylic acid and said diamine in amounts corresponding to a molecular ratio of said acid to said diamine of 0.9–1.1:1.1–0.9 respectively in water, adding a water-miscible solvent having a boiling point of about 200°–300° C. in an amount up to 20% by weight of both said acid and said diamine, heating the thus-formed mixture to boiling and distilling off water until a predetermined acid number of 100–150 is attained, and adding a base which is a member selected from the group consisting of ammonia and amines to thereby neutralize the acidic mixture.

3. The varnish of claim 1, said step of reacting including adding a water-miscible organic solvent.

4. The varnish of claim 1, said cyclopentane tetracarboxylic acid being in a dianhydride form.

5. A process for producing an aqueous electrically insulating varnish, comprising the steps of reacting cyclopentane tetracarboxylic acid with a dicyclic, diprimary aromatic diamine in the presence of water and neutralizing the condensation product with a volatile base, so as to form a varnish.

6. The process of claim 5, said step of reacting comprising mixing said cyclopentane tetracarboxylic acid and said diamine in amounts corresponding to a molecular ratio of said acid to said diamine of 0.9–1.1:1.1–0.9 respectively in water, adding a water-miscible solvent having a boiling point of about 200°–300° C. in an amount up to 20% by weight of both said acid and said diamine, heating the thus-formed mixture to boiling and distilling off water until a predetermined acid number of 100–150 is attained, and adding a base which is a member selected from the group consisting of ammonia and the amines to thereby neutralize the acidic mixture.

7. The process of claim 5, said step of reacting including adding a water-miscible organic solvent.

8. The process of claim 5, said cyclopentane tetracarboxylic acid being in a dianhydride form.

9. The process of claim 6, said base being a member selected from the group consisting of amines having a boiling point not greater than 200° C.

* * * * *